United States Patent [19]

Leinweber

[11] 4,256,327
[45] Mar. 17, 1981

[54] TORSION TYPE TANDEM SUSPENSION

[75] Inventor: Robert L. Leinweber, Mentor, Ohio

[73] Assignee: Eaton Corporation, Cleveland, Ohio

[21] Appl. No.: 9,616

[22] Filed: Feb. 5, 1979

[51] Int. Cl.³ .............................................. B60G 5/04
[52] U.S. Cl. .................................... 280/684; 280/700; 280/721
[58] Field of Search ............... 280/679, 684, 695, 700, 280/721, 723, 664

[56] References Cited

U.S. PATENT DOCUMENTS 2,665,141  1/1954  Lindblom ........................... 280/684

FOREIGN PATENT DOCUMENTS 690478  4/1940  Fed. Rep. of Germany ........... 280/700
2416636  10/1975  Fed. Rep. of Germany ........... 280/679
1316441  12/1962  France .................................. 280/700

Primary Examiner—John J. Love
Assistant Examiner—Ross Weaver
Attorney, Agent, or Firm—R. J. McCloskey; H. D. Gordon

[57] ABSTRACT

A torsion type tandem axle suspension (10) comprising a rocking beam assembly (34) rotatably mounted to each end of a container tube (62) which is mounted to a vehicle frame (12) by means of brackets is provided. Each rocking beam assembly comprises a first rocking beam (36) splined at one end to the outer end of torsion rod (42) and a second rocking beam (38) splined at one end to the outer end of a torsion tube (44). The torsion rods are telescopically received in the torsion tubes and splined at their inner ends to the torsion tubes. The torsion tubes are rotatably received in the container tubes.

2 Claims, 3 Drawing Figures

TORSION TYPE TANDEM SUSPENSION

BACKGROUND OF THE INVENTION

1. Field of the Invention

This invention relates to tandem axle suspension systems for vehicles and more particularly relates to tandem axle suspension systems of the type comprising a rocking beam assembly mounted to each side of a vehicle chassis by a bracket, each rocking beam assembly comprising a pair of rocking beams each extending in opposite directions from a torsion coupling which is resiliently supported by the bracket, the torsion coupling resiliently constraining the pair of rocking beams to pivot as a unit but permitting independent resilient pivotal movement of the individual rocking beams.

2. Description of the Prior Art

Tandem axle suspensions for vehicles are well known in the prior art as are tandem axle suspensions of the type comprising a pair of rocking beams pivotably mounted to each side of the vehicle wherein the beams are resiliently constrained to pivot as a unit but are resiliently independently pivotable as may be seen by reference to U.S. Pat. Nos. 3,977,700 and 3,614,121. Torsion type tandem suspensions are also known in the prior art as may be seen by reference to U.S. Pat. No. 2,613,954. Such prior art tandem suspensions have been widely used and are considered to be generally satisfactory in operation, however, such suspensions have been generally of a complicated construction utilizing a multiplicity of coil springs, leaf springs, pistons, air springs and/or bushings and the like and thus were complicated and relatively expensive to manufacture, assemble and/or maintain.

SUMMARY OF THE INVENTION

In accordance with the present invention, the drawbacks of the prior art have been overcome to the extent that a relatively simple and inexpensively produced torsion type tandem suspension is provided. The above is accomplished by providing a torsion type tandem suspension comprising a rocking beam assembly mounted to each side of vehicle chassis by a bracket structure. The rocking beam assemblies each comprise a pair of rocking beams, each beam of which extends in opposite directions from a torsion coupling which is pivotably mounted in the bracket structure. The torsion couplings comprise a torsion bar which is rotatably received in a torsion tube, one of the rocking beams splined to the free end, or outer end of the torsion bar and the other of the beams splined to the free or outer end of the torsion tube. At their other ends, the torsion bar and torsion tube are connected by a splined connection. The torsion tube is rotatably received in a container tube assembly which forms a portion of the bracket structure.

Accordingly, it is an object of the present invention to provide a new and improved torsion type tandem suspension.

Another object of the present invention is to provide a relatively simple and inexpensive tandem axle suspension of the torsion type.

These and other objects and advantages of the present invention will become apparent from a reading of the detailed description of the preferred embodiment taken in connection with the drawings.

DESCRIPTION OF THE PREFERRED EMBODIMENT

Figure 1:
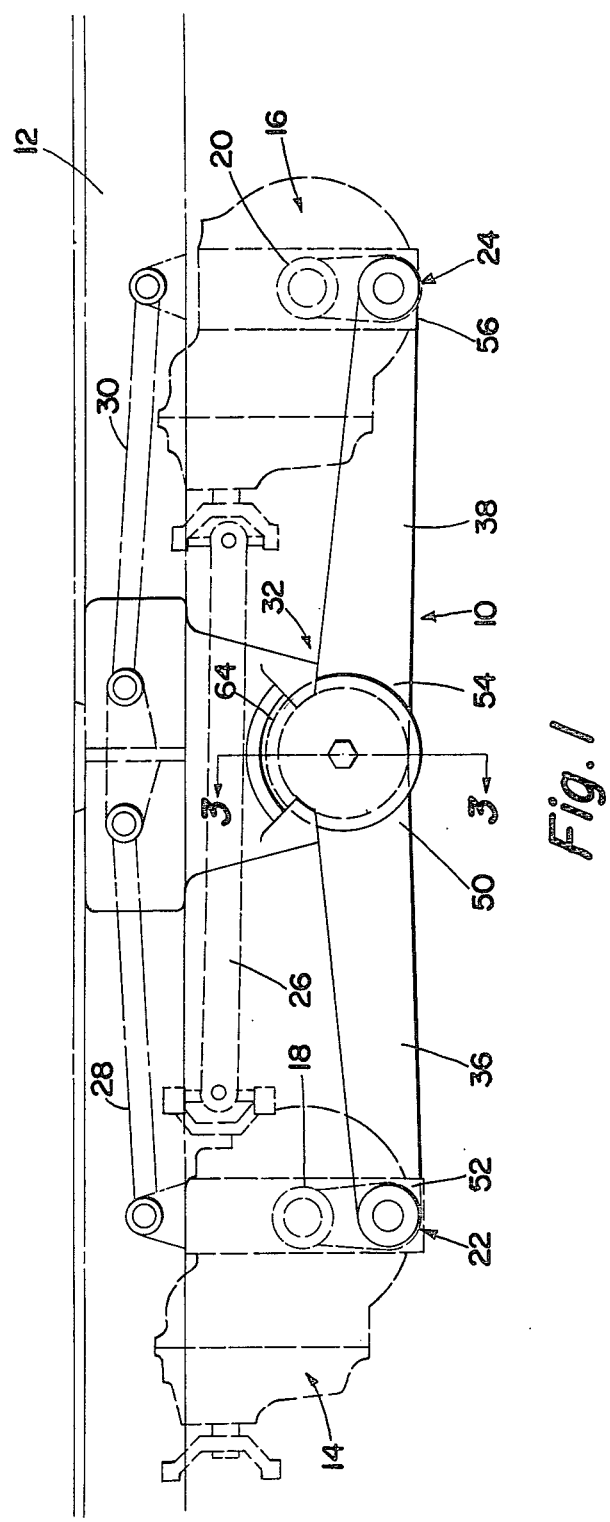
FIG. 1 is a fragmentary side view of a vehicle utilizing the torsion type tandem suspension of the present invention.

Certain terminology will be used in the following description for convenience in reference only and is not intended to be limiting. Words such as "up", "down", "upwardly", "downwardly", "front", "rear", "inner" and "outer" and words of similar import will refer to directions in the drawings or directions on the vehicle illustrated in the drawings.

The torsion type tandem suspension 10 of the present invention may be seen as mounted to a vehicle chassis by reference to FIG. 1. The vehicle comprises a frame, one longitudinally extending member of which, 12, is illustrated. A tandem drive axle assembly comprising front-rear drive axle 14 and rear-rear drive axle 16 is mounted to the frame by means of the suspension 10. As is well known, each of the drive axles 14 and 16 comprise axle housings having transversely extending arms 18 and 20, each of which is equipped with a hanger bracket, 22 and 24 respectively, for pivotally mounting the axle housings to the suspension. The tandem drive axle assembly also includes a drive shaft 26 extending from the front-rear to the rear-rear drive axle and a pair of link bars, 28 and 30, extending from the chassis to the housings 18 and 20 respectively, to retain the proper relative positions of drive axles 14 and 16 relative to one another and to the vehicle chassis. Extending downwardly from frame member 12 at a point intermediate the front-rear drive axle 14 and the rear-rear drive axle 16 is a bracket structure 32 which mounts the torsion type tandem suspension 10 to the frame member 12.

Figure 2:
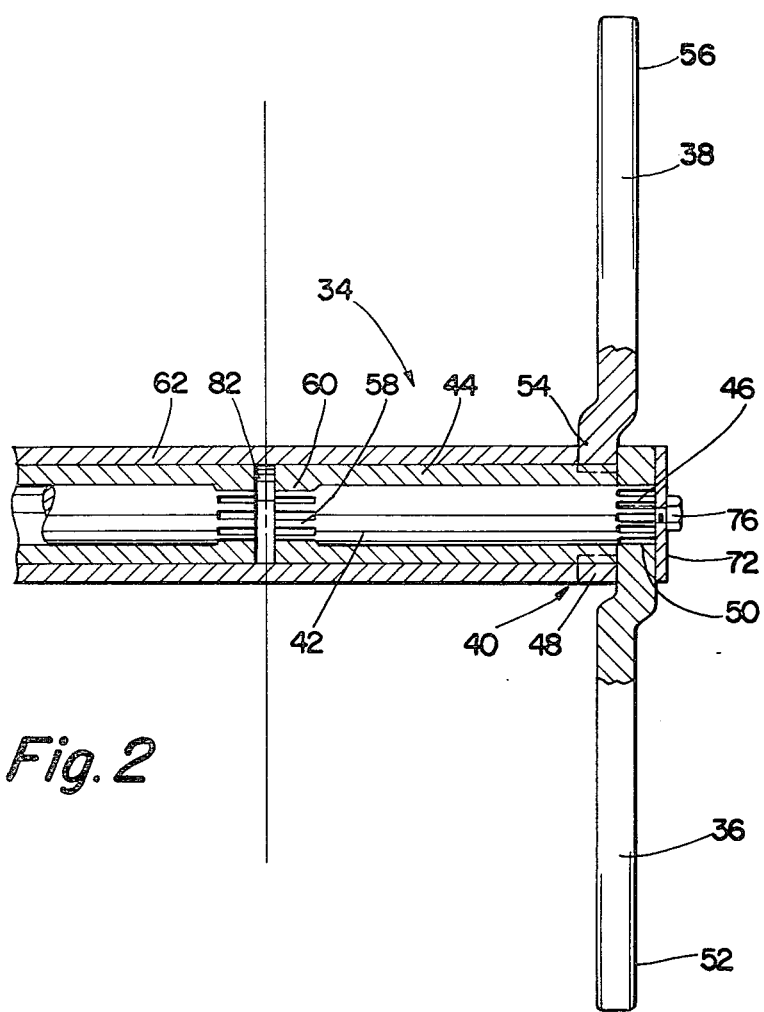
FIG. 2 is an enlarged fragmentary top view of the suspension of the present invention.
Figure 3:
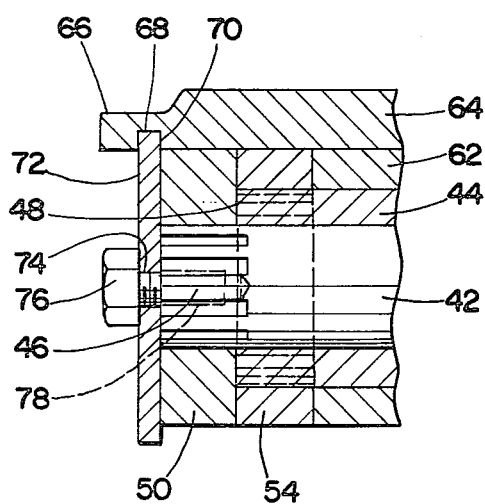
FIG. 3 is an enlarged fragmentary sectional view taken substantially along line 3—3 of FIG. 1.

The torsion type tandem suspension 10 includes a pair of rocking beam assemblies, one of which is mounted to each side of the vehicle chassis and one of which, 34, is illustrated in FIG. 2.

Rocking beam assembly 34 comprises a pair of rocking beams 36 and 38 which extend in opposite directions, generally horizontally, from a torsion connection 40 which is pivotably received in the bracket structure 34.

Torsion connection 40 comprises a torsion bar 42 of generally annular crosssection which is rotatably received in an annular torsion tube 44. The outer end 46 of torsion bar 42 extends beyond the outer end 48 of torsion tube 44. The rearward end 50 of rocking beam 36 is splined to the outer end 46 of the torsion bar while the forward end 52 is pivotally connected to the hanger bracket 22 of axle housing 18. The forward end 54 of rocking beam 38 is splined to the outer end 48 of torsion tube 44 while the rearward end 56 of the rocking beam 38 is pivotally connected to the hanger bracket 24 of axle. The torsion bar 42 is splined at its inner end 58 to the inner end 60 of the torsion tube 44. It is noted this splined connection is near the center line of the vehicle.

The torsion tube 44 is rotatably received in a container tube 62 which is a part of the bracket structure. A transversely extending hood member 64 of generally arcuate cross section may be attached to the upper surface of the container tube 62, as by welding or the like, to absorb vertical loads on the suspension system 10. Preferably, the hood will include a transverse extension 66 extending transversely beyond the outer end 46 of the torsion bar 42 which will be provided with a downwardly opening arcuate groove 68, the inner wall 70 of which will be generally aligned with the outer end 46 of the torsion bar. A disc type fastener 72 having a radius similar to the radius of arcuate groove 68 and having a generally centrally located aperture 74 is provided to transversely mount the torsion coupling and rocking beams to the bracket structure. The disc 72 is pushed into the slot 68 and then a headed, externally threaded fastener 76, such as a bolt, is passed through the aperture 74 and threaded into an internally threaded bore 78 provided in the outer end 46 of torsion bar 42. The container tube 62 and hood 64 are rigidly mounted to the frame by generally downwardly depending bracket 80. A specer 82 may be provided between the left hand and right hand rocker arm assemblies mounted in the container tube 62.

It may thus be seen that a relatively simple tandem axle suspension system of the rocking beam type is provided.

Although this invention has been described in its preferred form with a certain degree of particularity, it is understood that the description of the preferred form is by way of example only and that changes in the details of the design and arrangement of the parts may be resorted to without departing from the spirit and the scope of the invention as hereinafter claimed.

I claim:

1. A torsion type tandem axle suspension for mounting a first and a second transverse axle in longitudinally spaced manner to a vehicle frame comprising two longitudinally extending, transversely spaced frame members, said suspension comprising:
    a bracket mounted to and extending downwardly from each frame member, said brackets located longitudinally intermediate said axles;
    a transversely extending container tube rigidly mounted to said frame by said brackets, said container tube defining a generally annular bore at each end thereof;
    a rocking beam assembly rotatably received in each end of said container tube, said rocking beam assemblies each comprising a torsion coupling rotatably received in said container tube, a first rocking beam fixed at one end thereof to said torsion coupling and pivotably mounted at the other end thereof to said first axle and a second rocking beam fixed at one end thereof to said torsion coupling and pivotably mounted at the other end thereof to said second axle, said torsion couplings each comprising an annular torsion tube telescopically and rotatably received in said container tube and a torsion bar telescopically received in said torsion tube, each of said torsion tubes having an inner end located adjacent the center line of the vehicle and an outer end extending beyond the outer end of the container tube, said torsions bars each having an inner end fixed to the inner end of the torsion tube at a splined connection and an outer end extending beyond the outer end of the torsion tube, said one end of said first rocking beam fixed to said outer end of torsion rod and said one end of said second rocking beam fixed to the outer end of said torsion tube;
    a transversely extending hood member of generally acruate cross-section attached to said container tube, said hood member projecting transversely beyond the outer end of said torsion rod and defining a slot opening toward the axis of said container tube and generally transversely aligned with the end of said torsion rod; and
    an annular disc adapted to be received in said slot to limit axial movement of said rocking beam assembly relative to said container tube, said annular disc having a generally centrally located aperture therethrough, said disc having a thickness generally equal to the width of said slot and an outer periphery of a radius adapted to be rotatably received in said slot, said outer end of said torsion rod provided with a threaded bore and said suspension additionally comprising headed threaded fasteners adapted to pass through said aperture and be received in said threaded bore to attach said discs to the outer ends of said torsion rods.

2. The suspension of claim 1 wherein said slot is generally arcuate about a center line coaxial with the axis of said container tube.

* * * * *